Feb. 18, 1930.   R. KLIMBURG   1,747,550
CLOSING DEVICE
Filed March 21, 1928
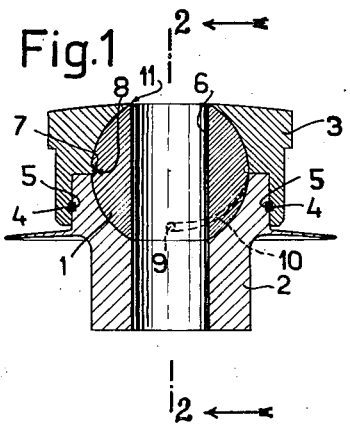
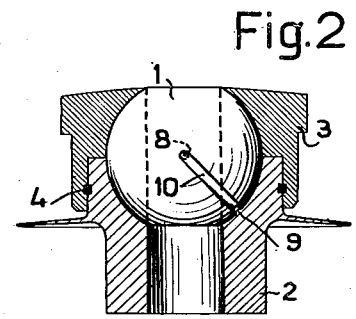
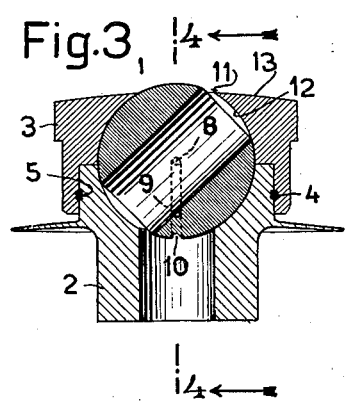
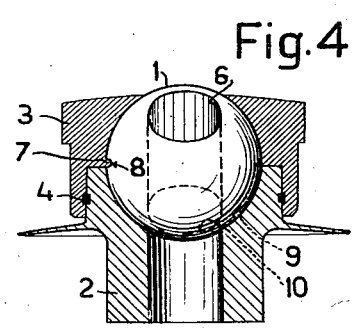
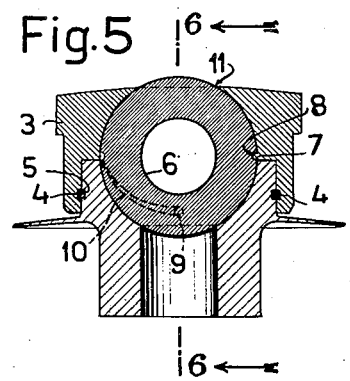
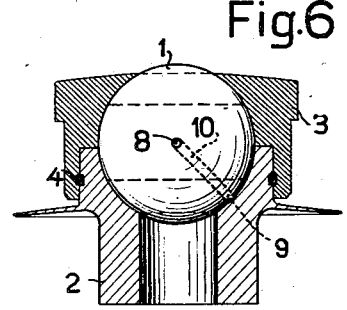
R. Klimburg
INVENTOR
By Marks & Clerk
ATTYS.

Patented Feb. 18, 1930

1,747,550

UNITED STATES PATENT OFFICE

RUDOLF KLIMBURG, OF VIENNA, AUSTRIA

CLOSING DEVICE

Application filed March 21, 1928, Serial No. 263,481, and in Austria August 17, 1927.

The invention relates to a closing device adapted for being employed in connection with pipes of all kinds, receptacles and particularly collapsible tubes (pliable receptacles for colors, creams and the like), lubricators (grease cups), etc.

Essentially this closing device consists of a cock, the plug of which is to be actuated by means of a socket or collar rotatable round the axis of the pipe to be closed up.

If the device is used in connection with tubes of the above mentioned kind the plug has advantageously spherical form and the rotatable socket is formed so as to constitute at the same time also part of the cock's casing.

An essential feature of the present invention consists in that the axis, round which the spherical plug turns, is formed by a little projection (nipple or the like) provided on the one rotatable part of the casing, which nipple engages with a recess of the spherical plug, whilst another nipple provided on the second part of the casing engages with a groove in the surface of the spherical plug.

Another improvement of the closure according to the present invention consists in a combination of the closing device with a pipe coupling element in such manner that the ends of two pipes, each of which is provided with such a combination, are automatically closed or opened, when coupled and uncoupled respectively.

In the annexed drawing two modes of carrying the invention into practice are illustrated by way of example. The Figures 1, 3 and 5 are sectional elevations of a closing device of tubes of the above mentioned kind or of grease cups, the ball formed plug being shown in different positions (open, half-way and closed position), and the Figures 2, 4 and 6 cross-sections of the same device according to the lines of section 2—2, 4—4, 6—6 of the first named three figures.

According to Figs. 1 to 6 inclusive the casing enclosing the spherical plug or ball 1 consists of two parts 2 and 3, which are rotatably connected to one another, for instance by means of a cut ring 4 engaging with a groove 5. The part 2 constitutes in our case the tubular extension (neck) of the tube, the part 3 is the above mentioned socket, which for the purpose of facilitating its rotation by hand may similarly to the usual caps be hexagonal or milled at the outer edge.

6 is the bore of the ball plug, through which bore the material is to be discharged. The ball can in relation to the casing part 3 only turn round an axis which is at right angles to the main axis of the tube. According to the illustrated example this limitation of the movements of the ball, which should otherwise be possible, is effected by a little boss or nipple 7 provided on the casing part 3 and engaging with a recess 8 of the ball. Nipple and recess may, if desired, be substituted by pin and hole. Owing to this arrangement the ball can only turn around the axis or straight line passing through said nipple 7 and the centre of the ball. The gear for turning the ball round the axis thus determined consists of a nipple 9 provided on the casing part 2 and of a groove 10 following the balls surface, with which groove the nipple 9 is engaging. If the cap-like part 3 is turned, the ball is also turned in the same direction by the nipple 7, but simultaneously the one side of the groove 10 is sliding on the nipple 9, whereby a rotation of the ball is caused round the axis passing through the recess 8 and the centre of the ball. After the cap 3 has been turned for 180°, the ball will have turned round this last mentioned axis for 90° and will have come into the position as shown by Figs. 5 and 6, in which the bore of the ball is at right angles to the channel in the extension of the tube, that is to say in the closed position. Figs. 3 and 4 show the parts in their half-way position. By said gear the movement is retarded, as a turning of the cap for 180° corresponds to an angular motion of the ball amounting to 90°. By turning the cap back into its original position the open position of the ball is re-established. It is evident, that in each direction the final position or end of motion is determined by the end of the groove 10, the movement of which is stopped by the nipple 9. If desired, the arrangement may be made such that opening and closing can be effected by turning the cap in the same direction, for which purpose it is only necessary to let the groove 10 extend all round the ball.

An essential feature of the described device consists in that the orifice 11 of the cap is constituted by the sharp edge formed by the spherical ball bearing surface 12 and the top surface 13 of the cap 3. In contradistinction to known closing devices working with a ball, in which the discharge opening is—although for a short way only—formed by the bore of a collar or the like, this new arrangement offers the advantage that the mass being discharged cannot adhere to said sharp edge of the orifice. This result is obtained all the better if said orifice has the same diameter as the bore of the ball through which the mass has to pass. Preferably also the top (outer) surface of the cap is not made flat but orbed.

What I claim is:

A closing device including a recessed spherical plug having a groove therein, a spherical casing for the plug including two parts rotatable with relation to each other, a projection on one part of the casing engaging the recess of the spherical plug, and a projection on the other part of the casing engaging in the groove of the spherical plug.

In testimony whereof I have signed my name to this specification.

RUDOLF KLIMBURG.